(12) United States Patent
Lang

(10) Patent No.: US 7,116,657 B1
(45) Date of Patent: Oct. 3, 2006

(54) SYSTEM AND METHOD FOR ESTABLISHING LONG DISTANCE CALL CONNECTIONS USING A DESKTOP APPLICATION

(75) Inventor: Alexander C. Lang, Toronto (CA)

(73) Assignee: Internet Operator (Asia) Pte. Ltd., Singapore (SG)

( * ) Notice: Subject to any disclaimer, the term of this patent is extended or adjusted under 35 U.S.C. 154(b) by 1017 days.

(21) Appl. No.: 09/642,671

(22) Filed: Aug. 22, 2000

(51) Int. Cl.
*H04L 12/66* (2006.01)

(52) U.S. Cl. .................................. 370/356; 370/352
(58) Field of Classification Search ............... 370/352, 370/353, 354, 355, 401; 379/229
See application file for complete search history.

(56) References Cited

U.S. PATENT DOCUMENTS

| | | | | |
|---|---|---|---|---|
| 5,553,124 | A | * | 9/1996 | Brinskele .................... 379/112 |
| 5,649,005 | A | * | 7/1997 | Lynch et al. ................ 379/242 |
| 6,018,568 | A | * | 1/2000 | Furman et al. ............ 379/93.15 |
| 6,181,680 | B1 | * | 1/2001 | Nagata et al. .............. 370/248 |
| 6,188,683 | B1 | * | 2/2001 | Lang et al. ................. 370/352 |
| 6,324,264 | B1 | * | 11/2001 | Wiener et al. ............. 379/88.2 |
| 6,804,225 | B1 | * | 10/2004 | Lang .......................... 370/352 |

FOREIGN PATENT DOCUMENTS

| | | |
|---|---|---|
| CA | 2239493 | 6/1997 |
| CA | 2248660 | 9/1997 |
| CA | 2198024 | 8/1998 |

OTHER PUBLICATIONS

Low, C., "The Internet Telephony Red Herring", Hewlett Packard Laboratories, Bristol, U.K., IEEE 1996, pp. 72-80.

* cited by examiner

*Primary Examiner*—Doris H. To
*Assistant Examiner*—Thien D. Tran
(74) *Attorney, Agent, or Firm*—Bereskin &Parr

(57) ABSTRACT

A system and method for establishing a long distance call connection between call stations over the PSTN initiates a call connection request from a desktop application adapted to operate locally on a user workstation. The desktop application communicates call connection information to a long distance service provider server without requiring a web browser when a request is initiated by a user. Call connection information is processed by the long distance service provider server and an information packet is sent to a call controller, to effect a call connection over the PSTN via a TDM toll switch. A communication connection with the long distance service provider server is automatically established by the desktop application when a request is initiated, and subsequently released when the call connection request is received and processed by the long distance service provider.

35 Claims, 9 Drawing Sheets

SYSTEM AND METHOD FOR ESTABLISHING LONG DISTANCE CALL CONNECTIONS USING A DESKTOP APPLICATION

CROSS-REFERENCE TO RELATED APPLICATIONS

This is the first application filed for the present invention.

MICROFICHE APPENDIX

Not applicable.

TECHNICAL FIELD

This invention relates, in general, to a system and method for establishing long distance call connections from a computer workstation using a packet network, such as the Internet. In particular, the invention relates to a system and method for establishing a long distance call connection between designated call stations using a desktop application residing on a computer workstation and adapted to communicate with a long distance service provider server.

BACKGROUND OF THE INVENTION

Traditional modes of communication have been transformed in recent years with the rapid growth of Internet-based technologies. However, telephone communication is still generally considered the most effective mode of communicating because it permits parties to conduct two-way high quality voice communication in real time.

In recent years, several systems have been invented for using the Internet to establish telephone connections. Those systems use Worldwide Web (WWW) technology to permit the setup of PSTN calls. A customer logs on to a WWW server and initiates a call by specifying an origination and a termination number which are passed to a PSTN switch that initiates two calls to the respective numbers and bridges the calls together. Providers of such services are typically able to offer discount long distance rates because they are not obliged to maintain a great deal of infrastructure in order to offer the service.

One system designed to provide long distance telephone connections using the Internet is described in Canadian Patent Application Serial No. 2,248,660 to Wiener et al. which was laid open to public inspection on Sep. 25, 1997. It describes a system for establishing a telecommunications call between two parties over the PSTN, using the Internet. A customer can access a web-enabled directory service from a computer using the Internet, to retrieve directory information. The directory service is hosted on a web server and includes a directory website, a directory application accessible via the website and directory database(s). The web server provides interfaces to the user accessing the website, and implements HTTP protocol to serve directory requests. Once a desired party is located in the directory, a telecommunications call can be requested with that party by selecting the party information. A message including the telecommunication address for the selected party, as well as the telecommunication address for the customer, is sent via the Internet to a control platform. The control platform provides control signals to a switch located on the PSTN based on the information sent in the message, causing the PSTN to dial the respective addresses identified. In this manner, a telephone connection may be effected between parties residing at the identified addresses. The control platform also uses the data contained in the message to forward charging and billing information to a charging and billing module.

Another system which employs the Internet to establish long distance telephone call connections through the PSTN is described in copending Canadian Patent Application Serial No. 2,198,024 to Lang et al., which was laid open for public inspection on Aug. 19, 1998. A registered user can log on to a long distance service provider's website to initiate a long distance call request. Call initiation is effected by completing a call request form by providing appropriate calling information. The calling information is forwarded in a call request packet to a server operated by the long distance service provider. The long distance service provider server extracts the calling information from the call request packet and forwards an encrypted packet to a call connection control computer for processing. The call connection control computer decrypts the packet and uses the calling information to instruct a toll switch to set up the call.

A disadvantage of such systems for providing long distance telephone service using the Internet is that the services can only be accessed using a web browser. They are therefore subject to the speed and efficiency of the WWW, due to the repeated transfer of information over the Internet required to effect each call connection request. In addition, such systems require substantially continuous access to the WWW if they are to be used for high-volume calling.

In a business environment where employees routinely place long distance calls for business reasons, the reduced rates offered by an Internet-based long distance service provider are appealing. However, given the volume of calls, it can be extremely inefficient to employ a system requiring use of a web browser to effect each call connection request. Furthermore, when a web browser is available to employees, the employees may be inclined to use the web browser for other than business purposes. Consequently, the systems taught by the known prior art are not optimally adapted for use in an office environment.

There therefore exists a need for a system that can harness the power of a packet network, such as the Internet, to establish long distance telephone calls in an efficient, convenient and cost effective manner without requiring the use of a web browser.

SUMMARY OF THE INVENTION

It is an object of the present invention to provide a system and method for establishing long distance call connections using a packet network in a time effective manner.

It is another object of the present invention to provide a system and method for establishing long distance call connections using the packet network which includes a pre-configured user workstation capable of automatically connecting to a long distance service provider server and identifying a user associated with that workstation.

It is yet another object of the invention to provide a system and method for establishing long distance call connections using the packet network that does not require a web browser.

It is yet another object of the invention to provide a system and method for establishing long distance call connections using the packet network which is adapted to control a user's calling activity.

It is a further object of the invention to provide a workstation configured with a desktop application adapted to send a call connection request message to a long distance service provider server to establish a long distance call connection.

The invention therefore provides a method of completing a call connection over the public switched telephone network (PSTN) from a desktop application residing on a computer workstation. The method comprises a first step of accepting call request information input by a user using an interface provided by the desktop application. A call connection request message is then formulated based on the information accepted from the user, and the call connection request message is forwarded over a connection established between the desktop application and a long distance service provider server to effect call completion.

The invention also provides a method of completing a call connection over the public switched telephone network (PSTN) from a desktop application operating locally on a computer workstation and having a communication connection with a long distance service provider server. The method comprises a first step of receiving a call connection request message at the long distance service provider server, sent from said desktop application. The user identification information contained in said message is verified and the call connection request message is processed to enable a call connection based on call station information contained in the message. A notification message is then sent to the desktop application, to notify the desktop application that said call connection is in progress.

The invention further provides a system for establishing a long distance call connection between call stations over the PSTN. The system comprises a long distance service provider (LDSP) server adapted to establish a call connection between at least two call stations in response to a call connection request message sent from a registered user. The system further comprises a desktop application adapted to operate locally on a user workstation to accept input from the registered user defining parameters for establishing the call connection, and communicate the parameters to the long distance service provider server in the form of a call connection request message. The system also comprises a call controller adapted to receive a call connection information packet from the LDSP server, based on the call connection request message and instruct a time division multiplexed (TDM) switch to establish a call connection between the at least two call stations.

The invention further provides a desktop application adapted to operate locally on a user workstation and establish a communication connection with a long distance service provider (LDSP) server. The desktop application comprises means for accepting call connection information input by a user; means for formulating a call connection request message based on said call connection information; means for determining if an existing communication connection is available through a packet network to the LDSP server; means for establishing a communication connection if an existing communication connection is not available; and means for sending the call connection request message to the LDSP server.

In accordance with the present invention, a user can initiate a long distance call connection between call stations from a desktop application that resides and operates locally on a user workstation. For the purpose of the present invention, a desktop application that resides and operates locally will be understood to mean a stand-alone desktop application residing on a user workstation that is capable of operating without the functionality of a web browser application. A desktop application may be configured for a specific, repeat user, or configured with a mandatory user verification procedure. If the desktop application is configured for a repeat user, user registration information is automatically sent to a long distance service provider server with each call connection request. In this manner, a user is not required to enter user information each time a call connection is requested. The desktop application may also be configured to automatically establish a connection to a long distance service provider server when a call connection request is effected from the desktop application. A time saving is thus realized by the user, because the locally operated desktop application automatically performs connection procedures and logon messaging. The connection established with the long distance service provider server may be any packet network connection, such as a standard Internet connection. The desktop application enables a workstation to effect a long distance call connection via a long distance service provider server (LDSP) without the use of a web browser. Consequently, the desktop application in accordance with the invention may be configured to permit a user to make long distance calls without providing the user with the capability for accessing the WWW.

The desktop application of the present invention preferably includes call request and directory features, and may be enhanced with web-enabled features provided via a service provider website if the user workstation is equipped with a web browser application. Additional long distance call connection features may be enabled via the web browser in conjunction with the features provided by the desktop application of the present invention. As such, additional features are accessible via a user workstation equipped with a web browser application, without limiting the speed and efficiency of the desktop application.

A system of the present invention provides a desktop application configured to contact an LDSP server when a call connection is requested. The desktop application preferably includes only modules required to enable a call connection request to the LDSP server. Accordingly, the desktop application of the present invention functions efficiently on a workstation to effect a long distance call request between designated parties having call station addresses.

The system of the present invention is capable of processing call connection requests more quickly than web-enabled systems, as a direct connection between a user's workstation and an LDSP server is established to initiate a call connection request. Further, if a dedicated packet network connection is not available when a request is initiated, the desktop application may be configured to automatically establish an appropriate connection, thus eliminating the need for a user to initiate a dial-up or logon procedure. In the case where a workstation is supported on an LAN or a digital subscriber line (DSL) link that supports a dedicated Internet connection, a call connection request may be enabled by connecting to the LDSP server via the dedicated connection and automatically identifying a user request using registration information stored by the application. The desktop application of the present invention may be configured to automatically provide user registration information to an LDSP server irrespective of the type of connection established.

Further, if a user does not require the added functionality of web-enabled features provided by a service provider web server, a workstation supporting the application of the present invention is preferably configured to connect with the LDSP server via the Internet without a web browser. A user employing the workstation is therefore inhibited from accessing the WWW. Accordingly, the present invention provides an efficient and controlled system for establishing long distance call connections over the PSTN via the packet network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system for establishing long distance call connections via a data packet network. The long distance call connections are established between call stations connected to the public switched telephone network (PSTN) by a long distance service provider (LDSP) server that receives instructions via the data packet network from a desktop application that resides and operates locally on a user workstation and does not require an Internet connection or web browser functionality.

Figure 1:
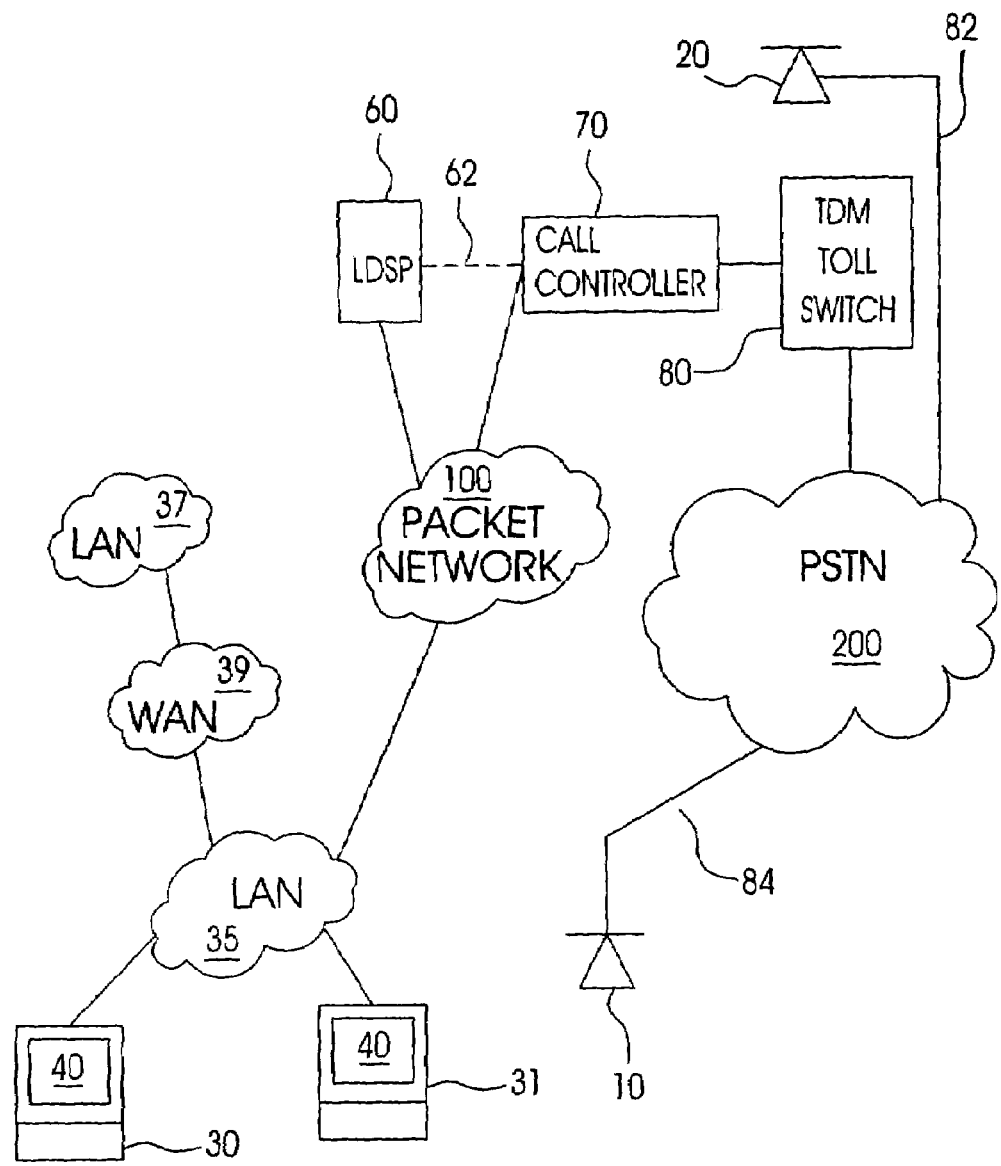
FIG. 1 is a schematic diagram of the arrangement of components in one exemplary system in accordance with the present invention.

FIG. 1 shows an overview of an exemplary system for completing a long distance call connection in accordance with one embodiment of the present invention. A call connection between call stations 10, 20, telephones for example, may be initiated by a user, from a pre-configured computer workstation 30, 31. Workstations 30, 31 are configured with a desktop application 40 adapted to connect with an LDSP server 60, via a packet network 100, such as the Internet, X.25, asynchronous transfer mode (ATM) or the like. In the embodiment shown in FIG. 1, workstations 30, 31 are connected to a LAN 35, which has access to the packet network 100. A plurality of workstations 30, 31 may be configured to connect with LDSP server 60 to initiate long distance call connections over the PSTN 200. As evident to one skilled in the art, a single LAN 35, or a wide area network (WAN) 39, supporting communications between LANs 35 and 37, may be configured to provide workstations 30, 31 with access to LDSP server 60. Alternatively, users may access the LDSP server 60 from stand-alone workstations. Thus, a company, for example, may register with the LDSP to provide designated employees with facilities for making long distance calls from the pre-configured workstations 30, 31. In addition, the LDSP server 60 may be configured to identify specific users associated with a given organization, and check a corresponding rule base specifying the request limitations of each user each time a call connection request is made. For example, a rule base may restrict a specific user's access to call connection requests designating a call station having a particular area code, or country code. Such restrictions can be used to limit a user's ability to establish call connections to those areas most often called for business purposes. A time or charge control feature may also be built using the rule base on LDSP server 60 for tracking the long distance charges incurred by a user. When a predetermined set amount of long distance charges have been incurred, a notification message may be sent to an administrator advising of the activity of that user. With such a control in place, an indication of unusually high levels of activity can be provided. In this manner, client side control features may be built in to the system of the present invention, to control and track the activity of a plurality of selected subscribers.

When a user registers with the long distance service provider for the service enabled by the present invention, a call completion application 40 is installed on computer workstations 30, 31 for use by authorized users, also referred to as "calling parties". Application 40 is configured at each workstation 30, 31 to contact the LDSP server 60 when a call connection between two call stations, 10, 20, for example, is desired. Contact with LDSP server 60 may be made via an existing packet network connection, or the application 40 may automatically establish a packet network connection for this purpose. Call completion application 40 provides call request capabilities that permit an application user to quickly and conveniently launch a call connection request from a configured workstation 30, 31. Access to the LDSP 60 may be achieved through any known type of packet network connection, and in the instance where computer workstations 30, 31 are supported by a local area network (LAN) 35, the packet network connection is commonly a dedicated Internet connection.

It is a known practice for a long distance service provider (LDSP) to provide registered users with access to PSTN toll services via the Internet. In doing so, a call controller 70 is interfaced by a signaling line with a PSTN toll switch 80 and controls connections made through the PSTN by the toll switch 80. The PSTN toll switch 80 is typically a time division multiplexed (TDM) toll switch. In response to a call connection request message, a call connection information packet is dispatched by LDSP server 60 to a call controller 70. Call controller 70 deciphers the call connection information packet and instructs toll switch 80 to initiate a first call to the calling party telephone 10 served by line 84. The call controller 70 then instructs the toll switch 80 to establish a second call to the called party telephone 20 served by line 82. If the first call is answered, the call controller 70 proceeds to instruct the toll switch 80 to establish a call connection between the first and second calls. It will be understood by those skilled in the art that details such as the PSTN Common Channel Signaling Network (typically an SS7 signaling network) are not illustrated for the purpose of clarity. It will be further understood by those skilled in the art that while only one LDSP server 60 and one call controller 70 are illustrated, a plurality of such servers and call controllers may be utilized for establishing long distance voice communication between parties.

As shown in FIG. 1, a calling party located at a pre-configured workstations 30, 31 may use call completion application 40 to input information required to identify the parties between which a long distance call connection is to be established. A dial feature of application 40 may be used to initiate a call connection request based on the information input.

When a call connection is initiated using desktop application 40, the desktop application 40 formulates a call connection request message, and the necessary communication connections between workstation 30, 31 and the LDSP server 60 are automatically established. A call connection request message preferably includes user identification information sent via the communication connection with the LDSP server 60. If so, a user verification procedure is conducted, and if the user identification information is determined to be valid a message authorizing the application 40 to proceed with the call connection request is returned to the desktop application 40 via the communication connection. In response to this message, the desktop application 40 forwards call connection request information to the LDSP server 60. At the LDSP server 60, information packets contained in the call connection request message are extracted and processed by various components of the LDSP server 60. As a result of such processing, a call connection information packet is dispatched to the call controller 70 and the toll switch 80 is instructed to connect the designated call stations. Communication connections between the LDSP server 60 and the call controller 70 may be established according to a number of methods known in the art. For example, a direct connection 62 such as an Ethernet connection may support communication between LDSP server 60 and call controller 70. In this case, TDM toll switch 80 may also support an Ethernet connection. Alternatively, the packet network 100 may be used to connect LDSP server 60 and the call controller 70 for transmission of call connection information packets therebetween.

Figure 2:
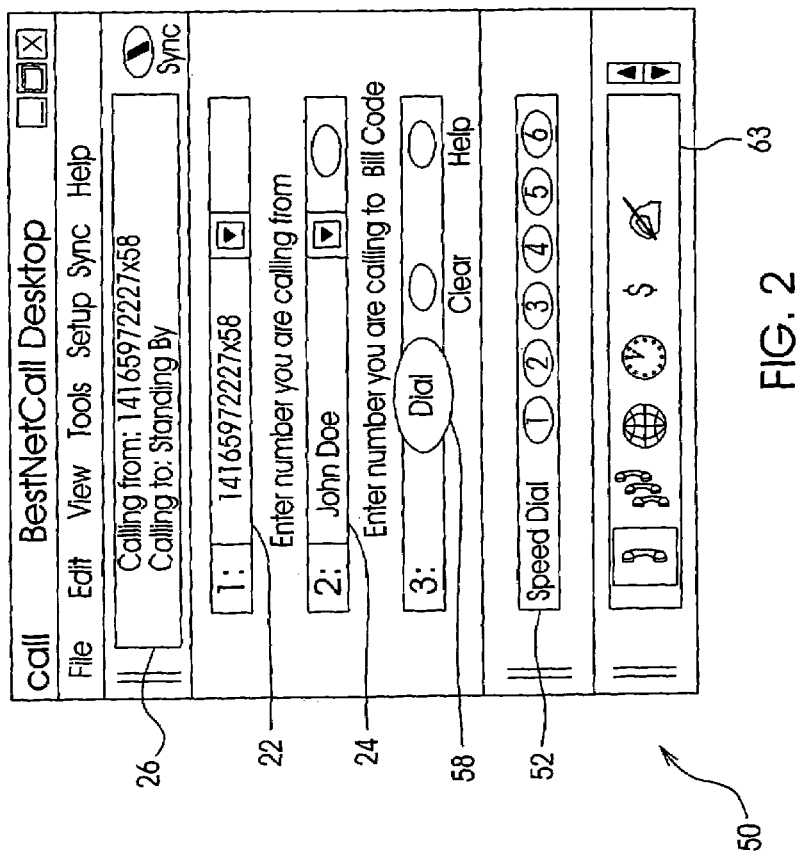
FIG. 2 is an illustration of a graphic user interface (GUI) of a desktop application in accordance with the present invention.

Desktop application 40 provides a graphical user interface (GUI) having built-in functionality for establishing call connections between call stations 10, 20 over the PSTN without the use of an Internet browser. The GUI 50, illustrated in FIG. 2, provides a calling party with convenient and efficient means for initiating a call connection request. In particular, desktop application 40 eliminates the requirement to logon to an LDSP website and download a call connection webpage each time a call connection is desired. A calling party can input the necessary details pertaining to a called party with whom a call connection is desired using the GUI 50, and enable a call connection request by selecting a dial feature, for example a dial icon 58. Desktop application 40 may be configured to include stored user identification information which is automatically sent to the LDSP server 60 when a call connection request is initiated.

As shown in FIG. 2, GUI 50 is adapted to accept call station information in call station fields 22, 24 for identifying the call stations between which a call connection is desired. Typically, a user will be party to the call connection requested, and call station information pertaining to a call station in close proximity to a user's workstation will be provided in a field for entering the number from which the call is placed, as shown at 22. GUI 50 may include various icons for enabling features of application 40, such as the dial icon 58. The GUI 50 of application 40 may be configured in any format adapted to provide a user with the features and functionality of the present invention. The features of application 40 may be provided in any number of user interfaces, and may be in any suitable form known in the art of GUI design. For example, features of application 40 may be provided in pull-down menu format or as icons within a user interface.

Application 40 may include a directory for storing call request information. This information may be stored in any number of formats, for example as called station numbers or called party names, as shown in call station fields 22 and 24, respectively. If information pertaining to a desired called party is stored in a directory file of application 40, the required call station information may be selected for insertion into a call station field 22, 24 of GUI 50. A called party directory may be provided as a pull down menu in the proximity of call station fields 22, 24, or in any other suitable format known in the art. In addition, the GUI 50 may be configured to include default calling station information in a calling station field 22 corresponding to a user's call station, when a user is routinely requesting call connections, involving his or her designated call station. Alternatively, call station information may be manually entered from a corresponding workstation 30, 31 and a call connection request or "dial" feature 58 selected to enable a call connection request. Further, call station information pertaining to a user's most frequently requested call stations may be programmed into a speed dial directory 52 and quickly accessed from GUI 50 for enabling an instant call connection request.

Once the appropriate call station information is supplied in call station fields 22, 24 of application 40, dial feature 58 may be selected, to initiate a call connection request. Dial feature 58 initiates the procedure for establishing a long distance call connection between the designated call stations, as will be discussed in more detail below. In essence, selection of the dial feature 58 prompts desktop application 40 to formulate a call connection request message based on the specified information input to establish a communication connection with the LDSP server 60.

GUI 50 preferably includes an information display window 26 for displaying status information associated with a call connection request. Information display window 26 may provide a medium for displaying a notification message received from a LDSP server 60 via communication connections, indicating the status of the call connection request at the server side. A tool bar 63 for initiating additional features provided by application 40 may also be enabled in the GUI 50. The features displayed in tool bar 63, as well as most features available in GUI 50, may be inactivated using configuration options provided by application 40. Alternatively, feature icons displayed in GUI 50 may be inactivated by default where the systems of a workstation supporting desktop application 40 are not compatible or complete. For example, a feature displayed in GUI 50 may be a web-enabled feature, supported by the LDSP web server 60 (FIG. 1). If a workstation supporting desktop application 40 is not equipped with a web browser adapted for connection to the LDSP web server, then the web-enabled features of GUI 50 will not be accessible to that user, from that particular workstation.

Tool bar 63 may provide access to web-enabled features of the present invention compatible with desktop application 40. These web-enabled features are preferably supported by a corresponding LDSP web server 65, and may be accessed by a registered user from any workstation having Internet access and a web browser application. When an icon is selected from tool bar 63, a compatible web-browser is launched and a webpage is downloaded to the user workstation. The webpage may include a form into which the user inputs information required to enable the selected feature. The completed form is then uploaded from the user workstation to the web server and the web-enabled feature is activated. Each web-enabled form may require a user to input user identification information to ensure that the user is authorized to initiate the requested web-enabled feature.

The web-enabled features preferably support complex features and data presentation capabilities of the present invention. For example, web-enabled features may include conference calling, country code and time zone information display, long distance rate searches, and account editing capabilities. These web-enabled features are made available via the LDSP web server 65 to registered users. Other commonly used features, such as directory files and call connection requests, are locally available to a user workstation 30, 31, for fast and easy access. As a result, local system resource usage is kept to a minimum and call connection requests can be conveniently and quickly initiated from a user's workstation.

In addition, a user may be required to input web server user identification to gain access to the respective web-enabled features of the present invention. As a result, web-enabled features of the present invention may be disabled for any given user.

User identification information can be stored by desktop application 40 and sent to an LDSP server 60 with each call connection request if the desktop application 40 is pre-configured to store logon information for connecting to LDSP server 60. For example, in order to use the system of the present invention to establish long distance call connections, a calling party must be a registered user recognized by the LDSP server 60. User specific identification information sent to LDSP server 60 with each call connection request message identifies the user and permits the LDSP server 60 to validate the incoming request, determine whether an associated user account is in good standing, and process and bill the transaction accordingly. Consequently, each registered user is assigned unique user identification information that is stored on LDSP server 60 and used to verify each call connection request. Each time a registered user initiates a call connection request, the user identification information is checked to determine whether the user is still in good standing before the call connection request is processed. In this manner, user access to the LDSP server 60 can be denied if an account is determined to be overdue, for example.

Figure 3:
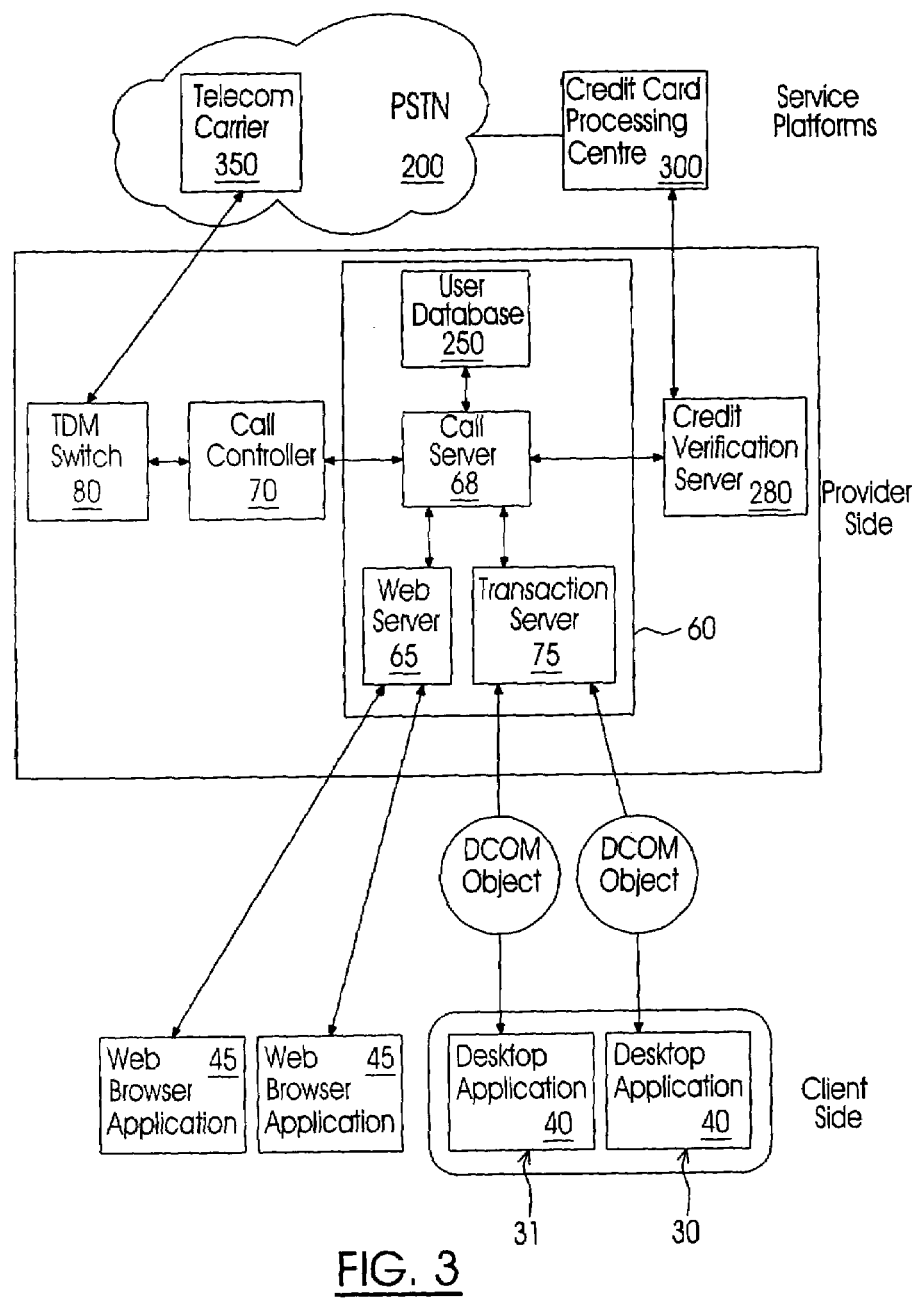
FIG. 3 is a schematic diagram of the communication pathways used by components in a system in accordance with the present invention.

FIG. 3 provides a detailed overview of the system in accordance with a preferred embodiment of the present invention. As illustrated, the system of the present invention may be described as a three-tier system utilizing client-side and provider-side components for accessing independent service platforms. Starting from the bottom of FIG. 3, on the client side, a client workstation 30, 31 is provided with a call completion application 40, and may also include a web browser application 45. On the provider side, an LDSP server 60 includes at least one server partitioned to provide a call server component 68, a web server component 65, a transaction server component 75 and a user database 250. The provider side of the present system also includes a call controller 70 adapted to control a time division multiplexed (TDM) toll switch 80, and a credit verification server component 280 for processing credit card transactions for registered users. For the purpose of clarity, each component of the provider side of the system has been illustrated as a separate server, however, it is possible for a single server to be partitioned to include one or more of the components illustrated to be part of the provider side of this system. In addition, the components of the provider side may be connected to an Ethernet, or otherwise interconnected using protocols and apparatus known in the art. Service platforms accessed by the system include the PSTN 200 for enabling call connections between designated call stations 10, 20 and communication connections with other systems supported thereon. Other such service platforms may include a telecom carrier 350 and a credit card processing centre 300 for processing credit card transactions. For example, the LDSP server 60 of the present invention may connect with a credit card processing centre 300, via a credit verification server 280 for supporting online credit card billing. The service components are not part of the present invention, but are described in connection with the present system for the purpose of clarity.

The call server component 68 is configured to communicate with the call controller 70, and web server component 65, when applicable. The call server 68 is not necessarily configured to directly process client side call connection requests. By providing a transaction server 75 on the provider side, an interpretation step can be handled by the transaction server 75 before the request is passed to the call server 68 for processing. As shown in FIG. 3, the desktop application 40 is configured to generate call connection request messages at a user workstation 30, 31 and send those messages to the LDSP server 60. Each call connection request message is sent from desktop application 40 to transaction server 75 where it is formatted for processing by call server 68. The processing steps performed by call server 68 preferably include steps of user verification, billing transactions which may include credit card authorization, and call connection. Messages exchanged between desktop application 40 and transaction server 75 may comply with any protocol compatible with desktop application 40 and transaction server 75, for example, an object oriented packet messaging protocol. In accordance with a preferred embodiment of the invention, transaction server 75 is a Microsoft transaction server as provided by Microsoft Corp.®, and application 40 is configured to generate call connection request messages utilizing a Distributed Component Object Model (DCOM) protocol. In accordance with the preferred embodiment, a new DCOM object is created each time a call connection request message is formulated by application 40, and sent to transaction server 75, where it is converted into a suitable format for processing by call server 68. Communications protocols used for messaging between transaction server 75 and call server 68, as well as, between web server 65 and call server 68 are a matter of design choice dependent principally on implementation details, as will be well understood by those skilled in the art.

Figure 4A:
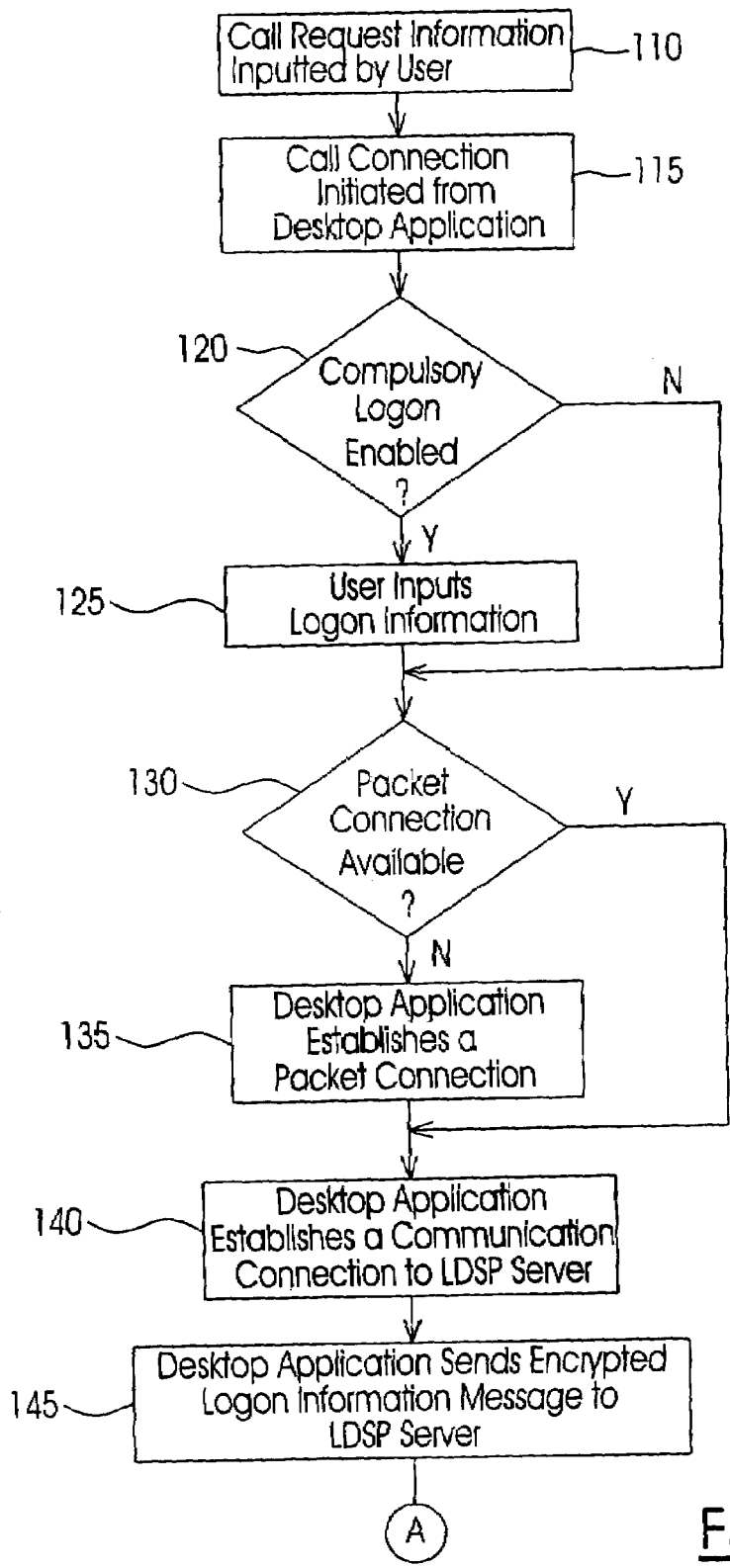
FIG. 4a is a flow chart illustrating an information processing procedure performed by a desktop application in accordance with the present invention.

FIG. 4a illustrates the principal steps involved in establishing a typical long distance call connection from the workstation 30 using application 40. A calling party, who is a registered user of the system, prepares a call connection request at step 110 using desktop application 40 by inputting call request information. As mentioned above, desktop application 40 preferably includes call connection features such as call directory and speed dial functions. Using these features, a user may quickly and conveniently specify details required to request a call connection over the PSTN between call stations. Alternatively, a user may input the required call station information in the appropriate fields of the GUI 50. When the information has been input, a call connection can be initiated from application 40, for example, by selecting the dial icon 58 (FIG. 2) available on GUI 50 (step 115). A call connection request message is formulated by desktop application 40 when the call request is initiated in step 115. At step 120, desktop application 40 determines whether a compulsory logon feature is enabled. If compulsory logon is enabled, a user is required to enter user specific logon information each time a call connection request is initiated (step 125) in order to control unauthorized use or enforce user-specific billing. The logon information input at step 125 is verified to ensure that the user has authorization to utilize desktop application 40. Alternatively, compulsory logon may be disabled to improve convenience and efficiency.

At step 130, desktop application 40 determines if a packet network connection is available for establishing a connection with LDSP server 60. If the packet network connection is located, application 40 proceeds to establish a communications connection with the LDSP server 60 via the packet network (step 140). A communications connection may be established using any suitable protocol for providing a messaging service between workstations 30, 31 running desktop application 40 and the LDSP server 60. For example, Distributed Component Object Model (DCOM) may be employed to enable messaging between a workstation 30, 31 and the LDSP server 60. DCOM is designed for use across multiple network transports, including Internet protocols such as TCP and HTTP, and enables Component Object Model (COM) software components to communicate directly over a packet network. If a packet network connection is not found, a packet network connection is automatically established by desktop application 40 at step 135, before proceeding to step 140. A packet network connection may be established in step 135 in accordance with any known method. After the appropriate connections are established (steps 135, 140), desktop application 40 sends an encrypted logon information message to the LDSP server 60 (step 145). The logon information contained in this message is retrieved from storage by application 40 if the compulsory logon feature is disabled.

Figure 4B:
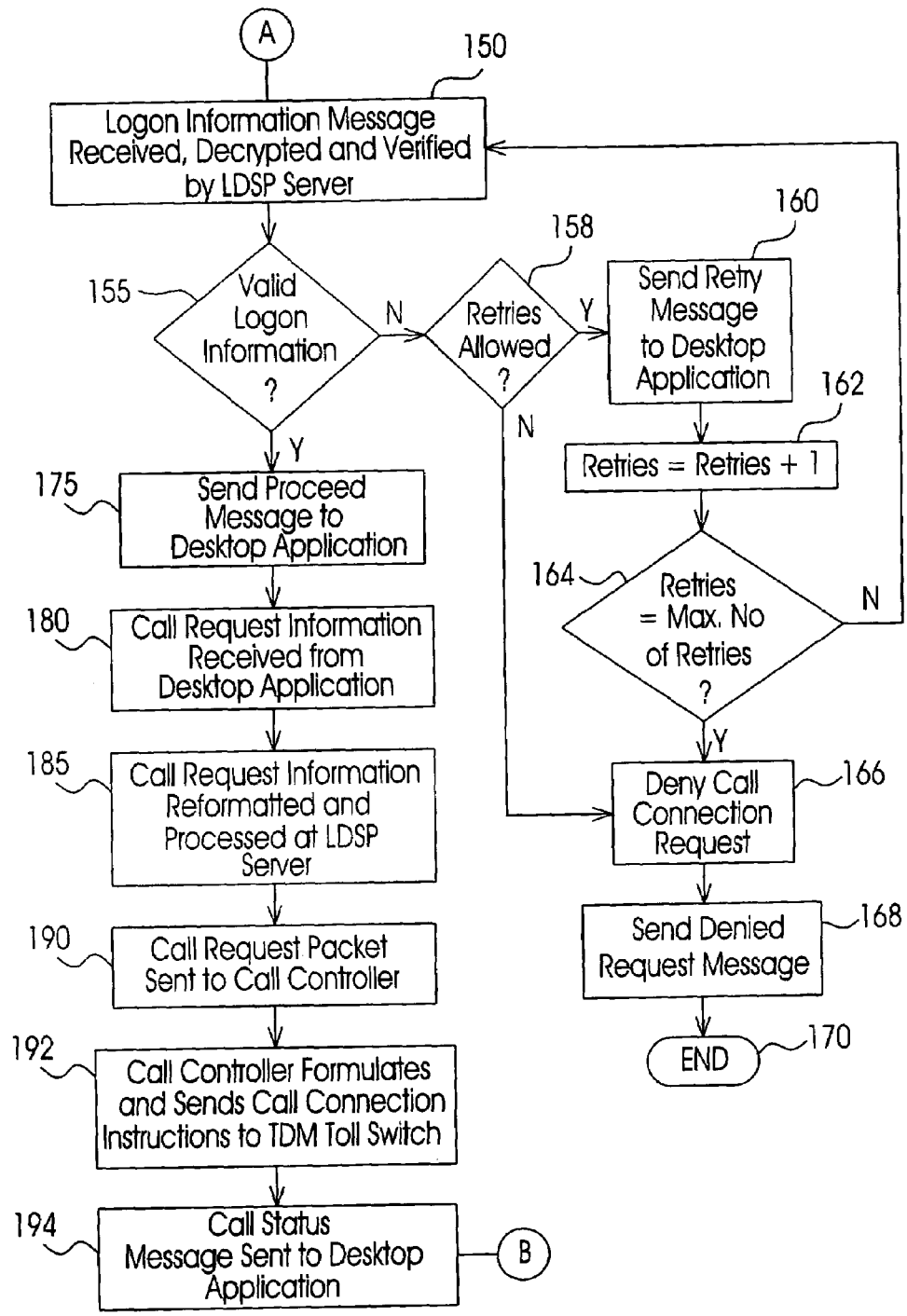
FIG. 4b is a flow chart illustrating an information processing procedure performed by a long distance service provider server application in accordance with the present invention.

FIG. 4b illustrates the principal steps performed at LDSP server 60 in response to a call connection request initiated by desktop application 40. An encrypted logon information message is received from application 40 and subsequently decrypted and verified by the LDSP server 60 (step 150). Decryption and verification of a logon information message may be performed in any number of ways known in the art for maintaining a secure system accessible only to registered users. Verification may be performed by LDSP server 60 by checking user identification information contained in the logon information message against user identification information stored in a user database 250 (FIG. 3) associated with the LDSP server 60. A user's identification information is preferably also processed to identify a corresponding account number and the status of that account is determined. An account database storing account information corresponding to each registered user is preferably maintained. If the user identification validation performed at step 150 fails, a series of retry steps may be initiated (steps 160–164), if the LDSP server 60 is configured to permit logon retries as determined at step 158. If so, a retry message is sent to desktop application 40 (step 160) and a retry counter is incremented (step 162). Unless a maximum number of retries has not been attempted (step 164), another logon attempt is made from desktop application 40 and LDSP server 60 returns to step 150. If a predetermined maximum number of retry steps are performed without success, the call connection request is denied (step 166), and a denied request message is sent to application 40 (step 168). A denied request message may specify why a request was denied, for example, "user identification information not recognized", "credit card not accepted" or "credit limit exceeded". When a denied request message is generated and sent to application 40, the call connection processing procedure of the LDSP server is terminated (step 170).

If the logon information in step 155 is determined to be valid, the procedure for establishing a call connection continues with the LDSP server 60 sending a message instructing application 40 to proceed with the request (step 175). In response to this message, at step 180, call request information is received from desktop application 40 containing the call request information entered in step 110. Upon receipt at LDSP server 60, the call request information is reformatted and processed (step 185). The processed information is sent via a call connection information packet to a call controller 70 (step 190). The call controller 70 processes the call connection information packet and sends instructions to a TDM switch 80 through which the call connection will be established (step 192). The communications between the LDSP server 60 and the call controller 70 are preferably effected using a protocol such as PPTP (point-to-point tunneling protocol) to increase the level of security. In addition, call controller 70 is preferably provided with software filters well known in the art to ensure that only packets originating from a recognized LDSP server are accepted as valid call connection packets. A notification or call status message is generated by the LDSP server 60 and sent to desktop application 40 at step 194, indicating that the call connection is in progress.

Figure 4C:
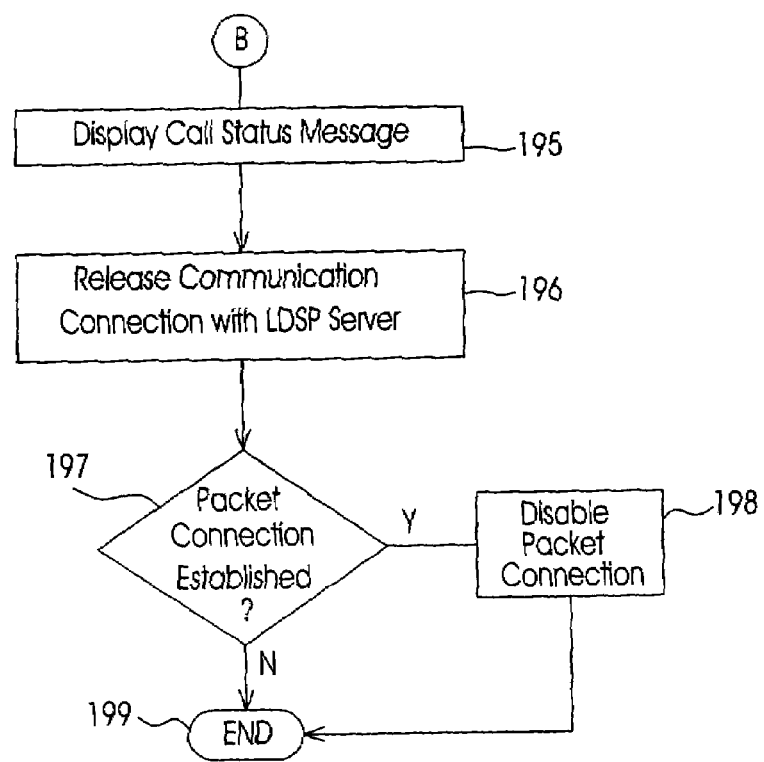
FIG. 4c is a flow chart illustrating another information processing procedure performed by a desktop application in accordance with the present invention.

FIG. 4c illustrates the principal steps preferably performed by desktop application 40 at a user workstation in response to a call status message sent in step 194. The call status message is received by desktop application 40 and a call status message displayed in an information display window 26 (FIG. 2) provided in GUI 50 (step 195). Desktop application 40 then proceeds to release the communication connection established between the workstation and the LDSP server 60 (step 196) and determines (step 197) whether a packet network connection was established at step 130. If a packet network connection was not established by the desktop application 40, no further action is taken and the procedure ends at step 199. Alternatively, if it is determined that a packet network connection was established by the desktop application at step 130, then that connection is closed (step 198), and the procedure is ended (step 199).

After the call request information has been provided to the TDM toll switch 80 (FIG. 3) by call controller 70, a call connection is established between call stations 10, 20 in accordance with procedures described in applicant's copending U.S. patent application Ser. No. 08/811,099 filed on Mar. 3, 1997, the specification of which is incorporated herein by reference. That is, once the required call station information has been provided, call controller 70 instructs the TDM toll switch 80 to place a first call to the calling party, a second call to the called party, and to conference the two calls together after the first call is answered.

Figure 5A:
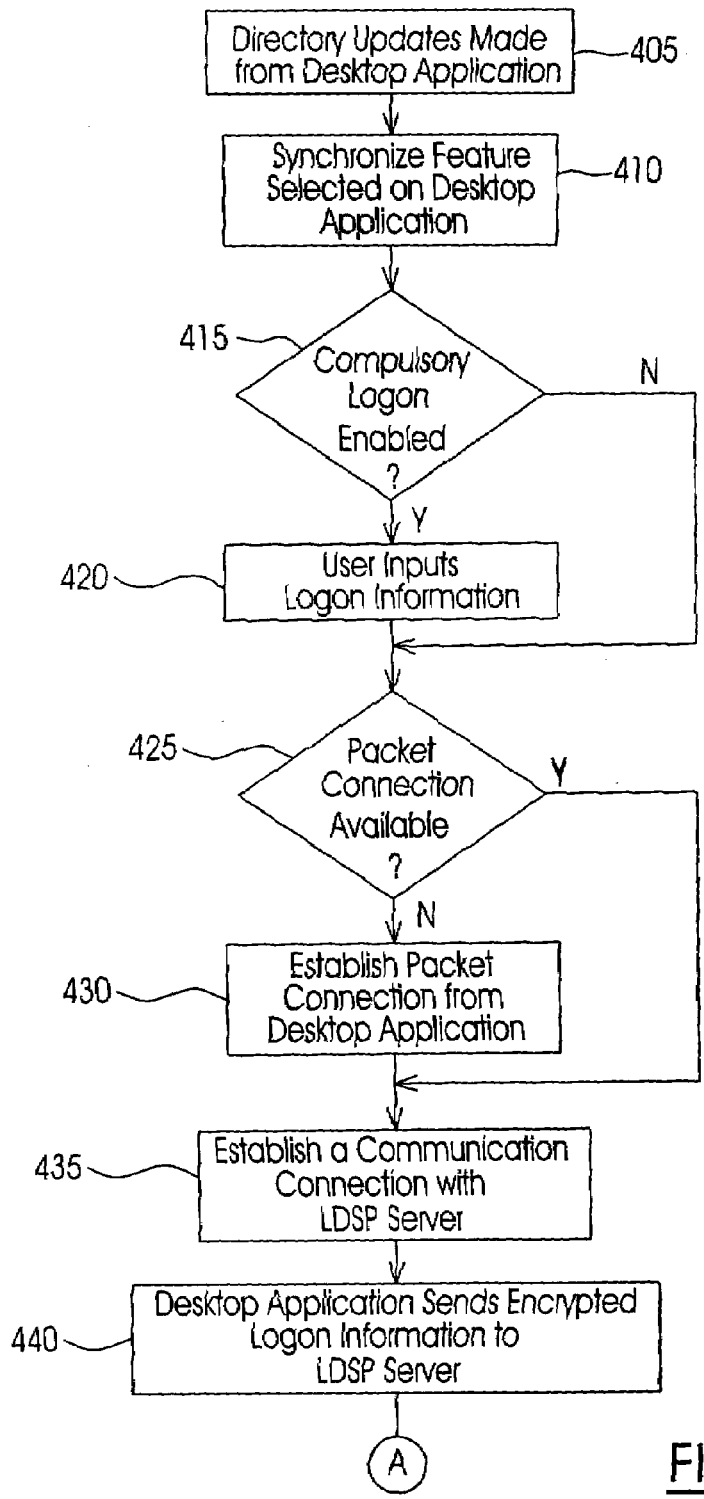
FIG. 5a is a flow chart illustrating a directory update procedure performed by a desktop application in accordance with the present invention.
Figure 5B:
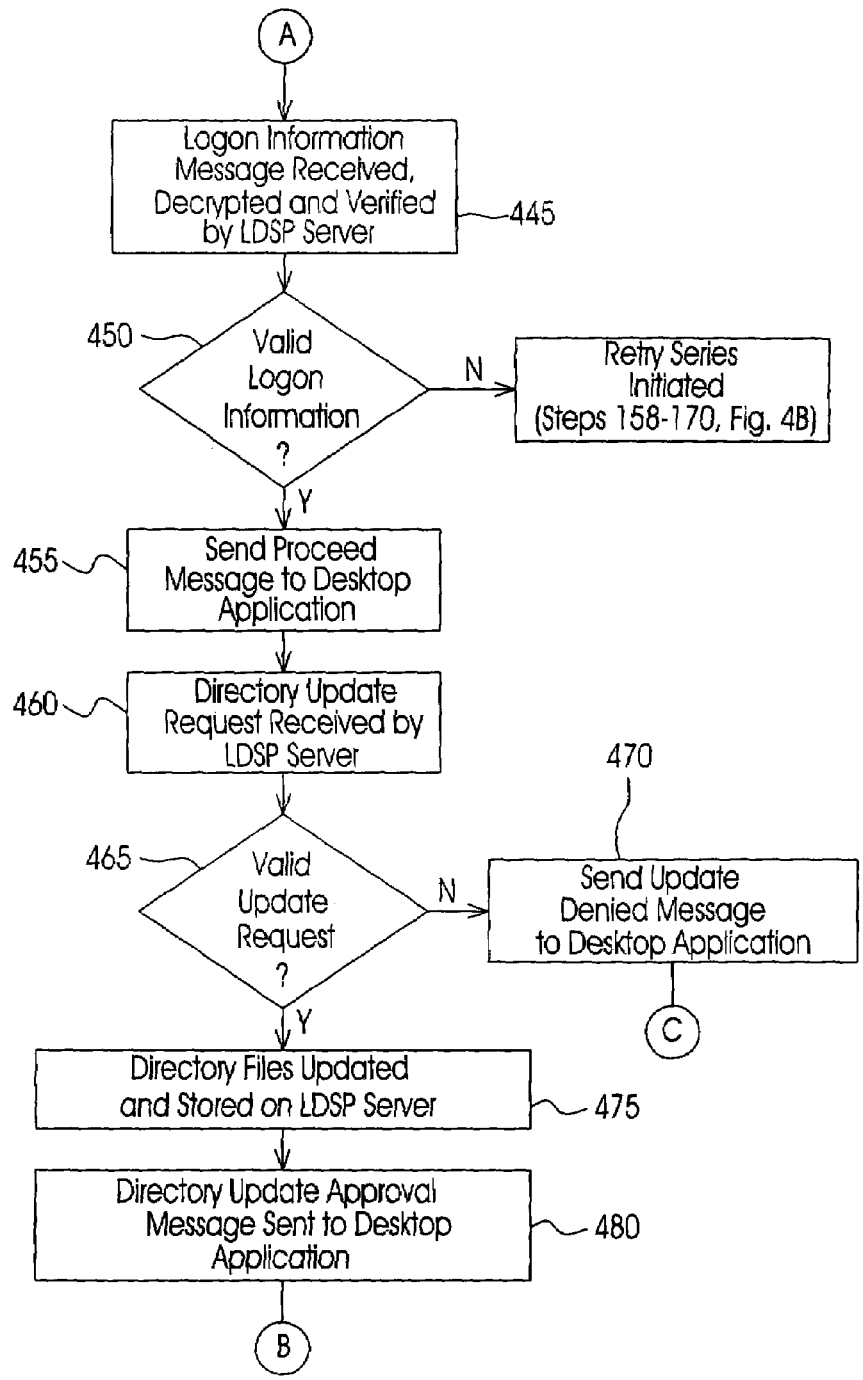
FIG. 5b is a flow chart illustrating a directory update procedure performed by a long distance service provider server application in accordance with the present invention.
Figure 5C:
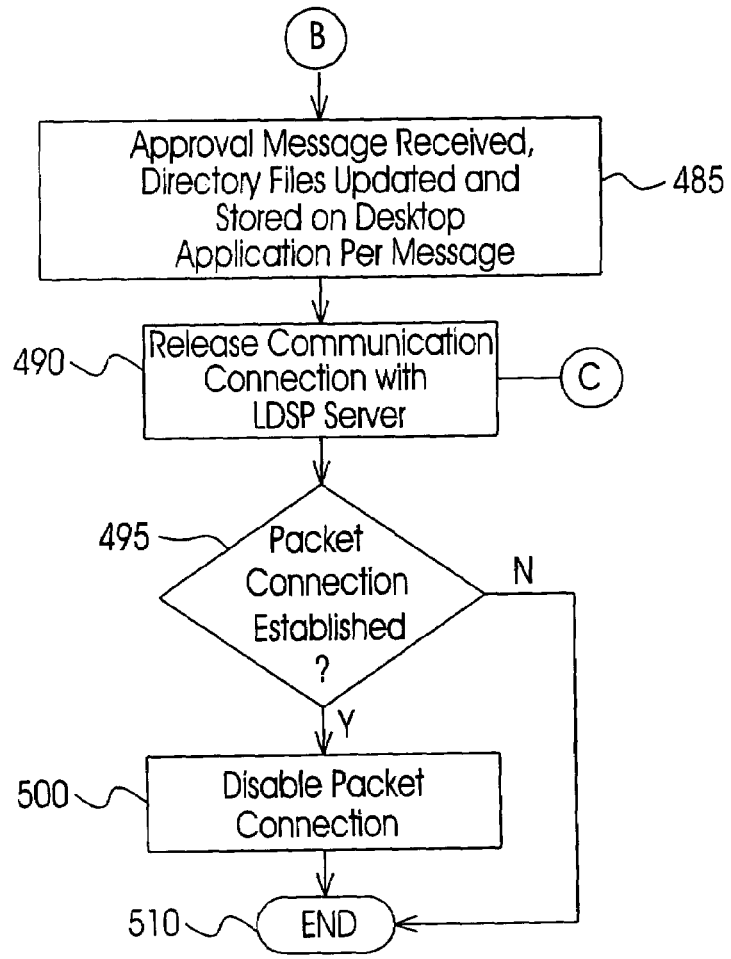
FIG. 5c is a flow chart illustrating another directory update procedure performed by a desktop application in accordance with the present invention.

According to a preferred embodiment of the invention, bi-directional updates to directory files stored on the user workstation and the LDSP server, are performed to enable traveling users to have their directories available when accessing the service using a web browser interface. FIGS. 5a, 5b and 5c illustrate the steps involved in a bi-directional directory update procedure in accordance with the invention. Directory files stored on a user workstation are synchronized with corresponding server side directory files each time either directory is updated to ensure that the user's directory files are mirrored in each location. This permits a user to access the most up-to-date records from his or her workstation as well as from a remote access to the web server component 65. When a directory update is on the LDSP server 60 by a web user or an administrator, a synchronization feature is automatically enabled to ensure that the corresponding client side directory files are updated on next logon from the user's workstation 30.

FIG. 5a illustrates the principal steps in a preferred method for updating directory files from a user's workstation. Desktop application 40 preferably includes features to enable editing of directory files locally stored on a user's workstation. Updates to a user's directory may be made by selecting a directory edit feature from GUI 50, and entering the appropriate directory information (step 405). After the updated information has been entered, a synchronization feature may be selected from GUI 50 to initiate the directory update procedure (step 410). This procedure includes establishing a connection with LDSP server 60, as described above with respect to completing a call request, to obtain authorization and to synchronize the LDSP server directory with the desktop application directory files that were updated. At step 415, a connection with LDSP server 60 is initiated by determining if a compulsory logon feature is enabled. If enabled, a user must input his or her logon information to proceed (step 420). Otherwise, application 40 proceeds to determine if a packet network connection is available (step 425). If a packet network connection is available, desktop application 40 establishes a communication connection with the LDSP server 60 (step 425). Otherwise, the packet network connection is established at step 430, before step 435 can be performed. With the required connections established, desktop application 40 sends encrypted logon information to the LDSP server (step 440).

As shown in FIG. 5b, at step 445, a logon information message is received, decrypted and verified by LDSP server 60. At step 450, LDSP server 60 determines if the logon information is valid. If not, a series of retry steps may be executed, as described above, and illustrated in FIG. 4b. If the logon information is determined to be valid, a message instructing the desktop application 40 to proceed is sent at step 455. In response to a message sent in step 455, a directory update request message is returned to the LDSP server at step 460, based on the updated information provided to desktop application 40 in step 405. At step 465, it is determined whether the directory update request is valid. This determination will be based on the level of authorization identified for the particular user, as well as the nature of the directory information to be updated. For example, a user may be restricted to requesting call connections within an assigned calling area or areas, having designated area codes. If an attempt is made to update a user's directory files to include call station information which is outside a user's assigned calling area, then the update request is denied, and a corresponding message is sent to desktop application 40 (step 470). In response to a message received from LDSP server 60 denying an update request, a connection release process is performed by desktop application 40, as illustrated by steps 490 to 510, of FIG. 5c. If an update request is valid, corresponding directory files on the LDSP server 60 are updated and stored (step 475). When the LDSP server directory files are updated in response to an update request, an approval message is sent from the server to the user workstation (step 480).

FIG. 5c illustrates the principal steps performed by desktop application 40 in response to receipt of the approval message sent by the LDSP server 60. On receipt of the message sent in step 480, the client side directory files are updated accordingly and stored on desktop application 40 (step 485). Following the update procedure of step 485, the communication connection with the LDSP server 60 is released (step 490). It is then determined, at step 495, whether a packet network connection was established for the purpose of sending the update request (step 430). If so, the connection is closed (step 500) and the update procedure is ended (step 510). Likewise, if an update denied message is received at step 470 in response to the directory update request, the procedure jumps to step 490 and the necessary connections are released and closed, to complete the procedure (steps 495–510).

With each logon procedure described above with reference to FIGS. 4a–c, a directory update check may be performed after the logon information has been verified, to determine if directory files updated on the LDSP server 60 need to be sent to the user workstation for incorporation into directories used by desktop application 40.

The system of the present invention provides a desktop application 40 adapted to communicate with an LDSP server 60 to establish long distance call connections between call stations over the PSTN. Desktop application 40 provides a registered LDSP user with a convenient and efficient tool for initiating a call request. The desktop application 40 enables a call connection request to be quickly initiated from a user workstation, permitting a user to perform other tasks while waiting for notification from a call station that a call connection has been established.

The embodiments of the invention described above are intended to be exemplary only. The scope of the invention is therefore intended to be limited solely by the scope of the appended claims.

I claim:

1. A method of completing a call connection over the public switched telephone network (PSTN) from a desktop application residing on a computer workstation, said method comprising:
   a) accepting call request information input by a user using an interface provided by the desktop application;
   b) formulating a call connection request message based on said information accepted from said user; and
   c) forwarding the call connection request message over a connection established between the desktop application and a long distance service provider server to effect call completion between at least two call stations by determining whether a packet network connection is available to the workstation and, if the packet network connection is not available, establishing the packet network connection prior to sending the request, and said connection established between said workstation and said long distance service provider server includes the packet network connection and a server-specific communication connection.

2. The method as claimed in claim 1, wherein formulating a call connection request message is initiated when the user enables an application feature available on said interface.

3. The method as claimed in claim 2, wherein said application feature prompts the desktop application to retrieve predetermined call station information and forward said call connection request message.

4. The method as claimed in claim 1, wherein inputting call request information includes selecting call station information from a directory stored on said workstation.

5. The method as claimed in claim 4, wherein said call station information is stored in said directory in association with a call party name.

6. The method as claimed in claim 1, wherein said server-specific communication connection uses Distributed Component Object Model (DCOM) protocol.

7. The method as claimed in claim 1, further comprising a step of releasing at least the server-specific connection between said long distance service provider server and said desktop application when a call status message indicating that the call request is being processed, is received from said long distance service provider server.

8. The method as claimed in claim 7, further comprising a step of releasing the packet network connection if it is determined that the packet network connection was established by said desktop application.

9. The method as claimed in claim 1, wherein forwarding the call connection request message includes a step of forwarding a first message containing user identification information.

10. The method as claimed in claim 9, further comprising steps of:
  a) receiving a confirmation message from said long distance service provider server confirming said user identification information; and
  b) forwarding a call request message containing call station information.

11. A method of completing a call connection over the public switched telephone network (PSTN) from a desktop application operating locally on a computer workstation having a communication connection with a long distance service provider server, said method comprising steps of:
  a) receiving a call connection request message at said long distance service provider server, sent from said desktop application via a packet network connection and a server-specific communication connection established by said desktop application between said computer workstation and said long distance service provider;
  b) verifying user identification information contained in said message;
  c) processing said call connection request message to enable a call connection to be established between at least two call stations based on call station information contained in said message; and
  d) sending a notification message to the desktop application, to notify the desktop application that said call connection is in progress.

12. The method as claimed in claim 11, wherein the step of processing said call connection request message further comprises steps of:
  a) formulating a call request packet based on said call station information; and
  b) forwarding said call request packet to a call controller connected to a time division multiplexed (TDM) switch, for effecting a call connection between call stations identified in said call connection request message.

13. A method of completing a call connection as claimed in claim 11, wherein said step of receiving a call connection request message further comprises steps of:
  a) receiving a first message from said desktop application via the server-specific communication connection, the first message containing user identification information;
  b) sending a confirmation message to said desktop application via the server-specific communication connection, the confirmation message authorizing said user identification information; and
  c) receiving a second message from said desktop application via the server-specific communication connection, the second message containing call station information identifying call station locations to be joined by a call connection.

14. A system for establishing a long distance call connection between call stations over the PSTN, said system comprising:
  a) a long distance service provider (LDSP) server for establishing a call connection between at least two call stations in response to a call connection request message sent from a registered user;
  b) a desktop application operating locally on a user workstation to accept input from said registered user defining parameters for establishing said call connection, and communicate said parameters to said long distance service provider server in the form of a call connection request message; and
  c) a call controller for receiving a call connection information packet from said LDSP server, based on said call connection request message and instruct a time division multiplexed (TDM) switch to establish a call connection between said at least two call stations;
  d) means for establishing a communication connection with said LDSP server for communicating said call connection request message, said means for establishing the communication connection including means for determining if an existing packet network connection is available, and if not, establishing a packet network connection.

15. The system as claimed in claim 14, wherein said means for establishing a communication connection further comprises means for establishing a communication connection compatible with said LDSP server.

16. The system as claimed in claim 15, wherein said communication connection is established using a Distributed Component Object Model (DCOM) protocols.

17. The system as claimed in claim 14, wherein said desktop application supports a call station directory.

18. The system as claimed in claim 14, wherein said desktop application supports a programmable speed dial feature.

19. The system as claimed in claim 14, wherein said desktop application further includes means for closing said packet network connection and communication connections when a message notifying that the call connection is in progress is received from said LDSP server.

20. The system as claimed in claim 14, wherein said desktop application further comprises means for encrypting call connection request messages.

21. A system for establishing a long distance call connection between call stations over the PSTN, said system comprising:
  a) a long distance service provider (LDSP) server for establishing a call connection between at least two call stations in response to a call connection request message sent from a registered user, said LDSP server further comprising a transaction component, a call connection component and a web server component;
  b) a desktop application operating locally on a user workstation to accept input from said registered user defining parameters for establishing said call connection, and communicate said parameters to said long distance service provider server in the form of a call connection request message; and
  c) a call controller for receiving a call connection information packet from said LDSP server, based on said call connection request message and instruct a time division multiplexed (TDM) switch to establish a call connection between said at least two call stations.

22. The system as claimed in claim 21, wherein said transaction component further comprises:
   a) means for receiving a call connection request message from said desktop application;
   b) means for decrypting said call connection request message; and
   c) means for formatting said call connection request message for processing by said call connection component.

23. The system as claimed in claim 22, wherein said desktop application further comprises:
   means for enabling call connection features on the LDSP web server.

24. The system as claimed in claim 23, wherein said means for enabling call connection features includes enabling a web browser application on said user workstation.

25. A system for establishing a long distance call connection between call stations over the PSTN, said system comprising:
   a) a long distance service provider (LDSP) server for establishing a call connection between at least two call stations in response to a call connection request message sent from a registered user, said LDSP server comprising a user database;
   b) a user workstation that accepts input from said registered user defining parameters for establishing said call connection, determines if a packet network connection to the LDSP server is available and establishes a packet network connection to the LDSP server if one is not available, and communicates said parameters to said long distance service provider server in the form of a call connection request message sent over the packet network connection to the LDSP server; and
   c) a call controller for receiving a call connection information packet from said LDSP server, based on said call connection request message and instruct a time division multiplexed (TDM) switch to establish a call connection between said at least two call stations.

26. The system as claimed in claim 25, wherein said user database stores user directory files.

27. The system as claimed in claim 26, further comprising means for synchronizing directory files residing on the user workstation with directory files stored in the LDSP user database.

28. The system as claimed in claim 26, further comprising a web browser application used to update the user directory files, and means for automatically performing a corresponding update to directory files residing on the user workstation when a communication connection with said LDSP server is established from said desktop application.

29. The system as claimed in claim 25, wherein said user database stores user account information.

30. A user workstation for establishing a communication connection with a long distance service provider (LDSP) server comprising:
   a) means for accepting call connection information input by a user;
   b) means for formulating a call connection request message based on said call connection information;
   c) means for determining if an existing packet network connection is available;
   d) means for establishing a packet network connection if an existing packet network connection is not available to support said communication connection; and
   e) means for sending said call connection request message to said LDSP server to establish a call connection between at least two call stations.

31. The user workstation as claimed in claim 30, wherein said means for accepting call connection information is a graphical user interface.

32. The user workstation as claimed in claim 30, wherein said means for sending said call connection request message further comprises means for sending user identification information to said LDSP server for verification.

33. The user workstation as claimed in claim 30, further comprising means for closing said communication connection after a call connection is initiated.

34. A computer-readable memory storing program instructions for instantiating the user's workstation as claimed in claim 30.

35. The user workstation as claimed in claim 30 further comprising:
   means for updating a call directory supported by said desktop application; and
   means for effecting a corresponding update to a user directory supported by said LDSP server.

* * * * *